US011759699B2

(12) United States Patent
Gottesman et al.

(10) Patent No.: US 11,759,699 B2
(45) Date of Patent: Sep. 19, 2023

(54) CLAW ARCADE GAME WITH PHOTO BOOTH AND METHOD OF MAKING SAME

(71) Applicant: CLAW EVENTS IP LLC, Oakwood, OH (US)

(72) Inventors: Russell Gottesman, Springboro, OH (US); Joseph Althaus, Yellow Springs, OH (US)

(73) Assignee: Claw Events IP LLC, Oakwood, OH (US)

( * ) Notice: Subject to any disclaimer, the term of this patent is extended or adjusted under 35 U.S.C. 154(b) by 0 days.

(21) Appl. No.: 17/829,001

(22) Filed: May 31, 2022

(65) Prior Publication Data
US 2022/0379196 A1    Dec. 1, 2022

Related U.S. Application Data

(60) Provisional application No. 63/194,543, filed on May 28, 2021.

(51) Int. Cl.
*A63F 9/30*     (2006.01)
*G07F 17/32*    (2006.01)

(52) U.S. Cl.
CPC ............ *A63F 9/30* (2013.01); *G07F 17/3297* (2013.01)

(58) Field of Classification Search
CPC ........ A63F 9/30; A63F 9/305; G07F 17/3297; G07F 17/3253
USPC .................................................. 273/447, 448
See application file for complete search history.

(56) References Cited

U.S. PATENT DOCUMENTS

| 6,234,487 | B1 | 5/2001 | Shoemaker, Jr. |
| 6,283,475 | B1 | 9/2001 | Stubben |
| 6,361,094 | B1 | 3/2002 | Pelley |
| 8,011,509 | B1 | 9/2011 | Sakamaki et al. |
| 9,754,460 | B2 * | 9/2017 | Sato ...................... A63F 3/0645 |
| 10,055,943 | B2 * | 8/2018 | Shoemaker, Jr. ..... A63F 9/0079 |
| 10,565,830 | B1 * | 2/2020 | Georgilas ............ G07F 17/3297 |
| 11,238,706 | B2 * | 2/2022 | Kim .................... G07F 17/3297 |
| 2003/0151202 | A1 | 8/2003 | Fisher et al. |

(Continued)

OTHER PUBLICATIONS (PCT) U.S. Patent and Trademark Office (ISA/US), International Search Report and Written Opinion of the International Searching Authority, International Application No. PCT/US2022/031618, 7 pages, dated Sep. 2, 2022.

*Primary Examiner* — Allen Chan
(74) *Attorney, Agent, or Firm* — Thompson Hine LLP

(57) ABSTRACT

A claw arcade game includes a housing; a claw assembly that is movable along a horizontal and vertical plane within the housing. In one embodiment, the claw assembly includes a plurality of flanges capable of being moved from an open position to a closed position. The claw arcade game may also include a claw control unit configured to control the movement of the claw assembly within the housing, wherein the claw control unit produces at least one unique signal that correlates to an event related to the movement of the claw assembly during a single game sequence. The claw arcade game may also include a camera assembly including a camera mounted within an upper portion of the housing; and a photo booth control unit configured to monitor at least a portion of the signals produced by the claw control unit, to sense the at least one unique signal, and to instruct the camera to take a photo in response to the sensing of the at least one unique signal.

16 Claims, 15 Drawing Sheets

(56) References Cited

U.S. PATENT DOCUMENTS

| | | |
|---|---|---|
| 2007/0114725 A1 | 5/2007 | Peck et al. |
| 2009/0191931 A1* | 7/2009 | Peck .................. G07F 17/3202 463/7 |
| 2018/0114399 A1 | 4/2018 | Riggles et al. |
| 2020/0175822 A1* | 6/2020 | Kim .................... G07F 17/3253 |

* cited by examiner

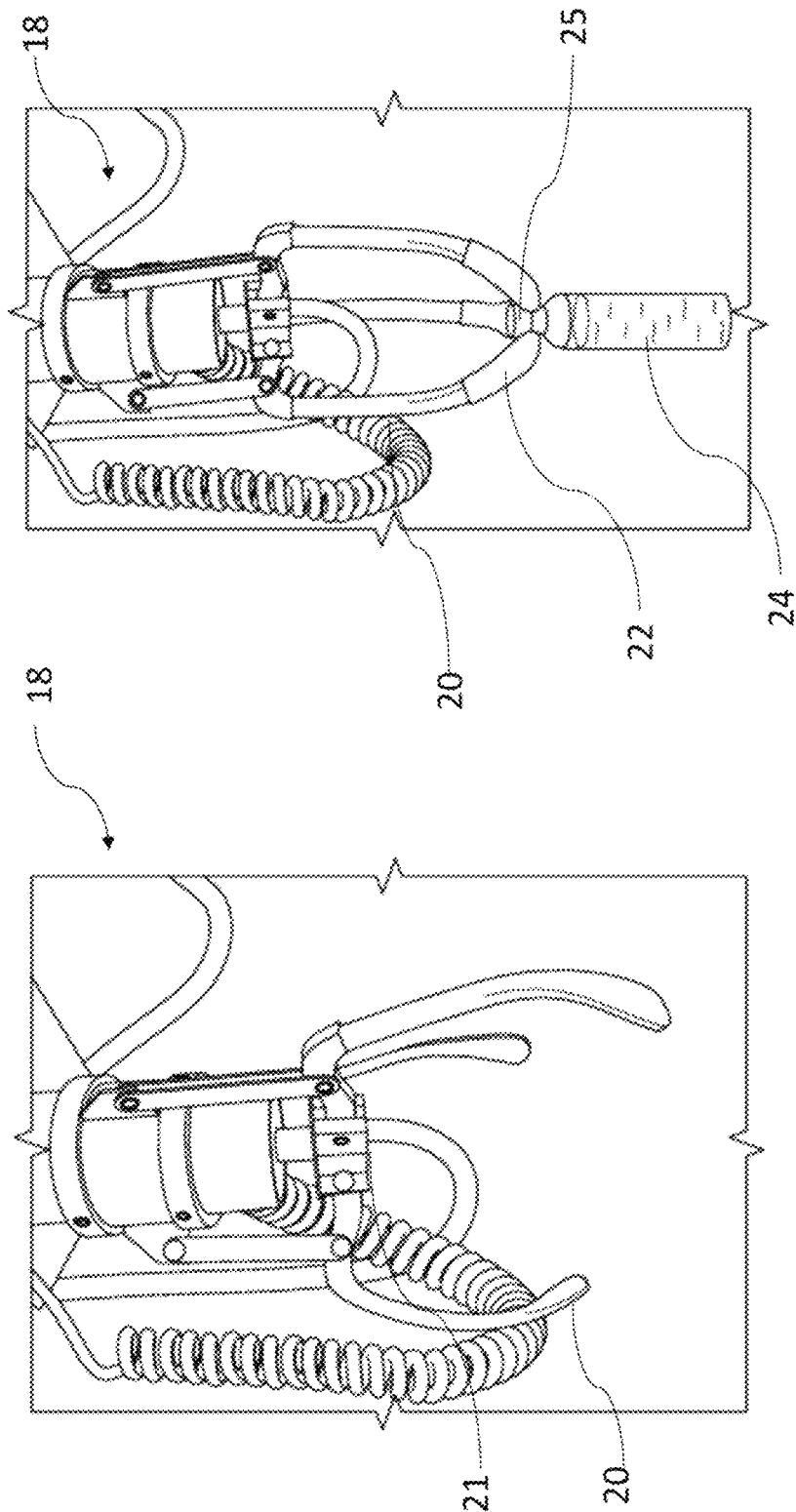

CLAW ARCADE GAME WITH PHOTO BOOTH AND METHOD OF MAKING SAME

RELATED TECHNOLOGY

This application relates to U.S. Provisional Application No. 63/194,543, entitled CELEBRATION ARCADE CLAW DEVICE AND GAME, filed on May 28, 2021.

FIELD

This application relates to a claw-type arcade game in which the utilizing a claw with a user positionable claw assembly configured to attempt to pick up prizes. Specifically, this application relates to a claw-type arcade game with an enhanced photo booth feature.

BACKGROUND

Claw-type arcade games have been delighting arcade users and party-goers for many years. Typically, a claw-type arcade games includes a claw assembly that allows a user to move a claw to a position over, for example, a bin full of plush toys, and cause the claw to descend into the bin, with the goal of capturing one of the toys. However, as users become more sophisticated, the demand for enhanced functionality of the games they play and uniqueness of the prizes received has become essential. And, as users become accustomed to using mobile devices with cameras to capture important moments of their lives, it would be desirous to provide an experience that could not only provide the user with unique prizes and gifts, but also capture the joy and excitement they felt in real time.

SUMMARY

A unique claw arcade game experience that incorporates user interactions with specific photo booth interaction points includes a housing; a claw assembly that is movable along a horizontal and vertical plane within the housing. In one embodiment, the claw assembly includes a plurality of flanges capable of being moved from an open position to a closed position. The claw arcade game may also include a claw control unit configured to control the movement of the claw assembly within the housing, wherein the claw control unit produces at least one unique signal that correlates to an event related to the movement of the claw assembly during a single game sequence. The claw arcade game may also include a camera assembly including a camera mounted within an upper portion of the housing; and a photo booth control unit configured to monitor at least a portion of the signals produced by the claw control unit, to sense the at least one unique signal, and to instruct the camera to take a photo in response to the sensing of the at least one unique signal.

In another embodiment, the claw control unit is configured to produce a plurality of unique signals that correlate to events related to the movement of the claw assembly. In another embodiment, the plurality of unique signals are configured to correlate to 1) an initial activation of a joystick, 2) a depression of a descend button, 3) the movement of the plurality of flanges from the open position to the closed position, 4) the movement of the plurality of flanges from the closed position to the open position, or a combination thereof.

In yet another embodiment, the photo booth control unit is configured to instruct the camera to take a photograph when each unique signal is sensed, retrieve each photograph from the camera, and store the photographs. In another embodiment, the photo booth control unit is configured to format the stored photographs and send the formatted photographs to a printer.

In one embodiment, distal ends of the plurality of flanges are each covered with a polymeric tip. The housing may further include an upper portion and a lower portion which are separated by a shelf, and a tray configured to support a plurality of miniature bottles. In one embodiment, the tray includes a upper portion, a middle portion, and a lower portion, wherein the upper portion comprises a plurality of similarly sized openings.

In another embodiment, a unique method for interfacing specific photo booth interaction points with a claw arcade game to produce a seamless user experience includes the steps of 1) providing a claw arcade game comprising a housing, a claw assembly that is movable along a horizontal and a vertical plane within the housing and wherein the claw assembly comprises a plurality of flanges capable of being moved from an open position to a closed position, and a claw control unit configured to control the movement of the claw assembly within the housing, wherein the claw control unit generates a plurality of unique signal that each correlate to a movement of the claw assembly during a single game sequence.

The method further includes identifying a specific set of desired points during the single game sequence that correspond to when a photograph should be taken; identifying a single signal from the plurality of unique signals that correlates to at least one of the desired points; and configuring a photo booth control unit to sense the single signal, and in response to sensing of the single signal, to instruct a camera to take a photograph.

BRIEF DESCRIPTION OF THE DRAWINGS

FIG. 3 is a detailed perspective view of a claw assembly in an open position for use with the claw arcade games of FIGS. 1 and 2;

FIG. 4 is a detailed perspective view of a claw assembly in a closed position for use with the claw arcade games of FIGS. 1 and 2;

DETAILED DESCRIPTION

Figure 1:
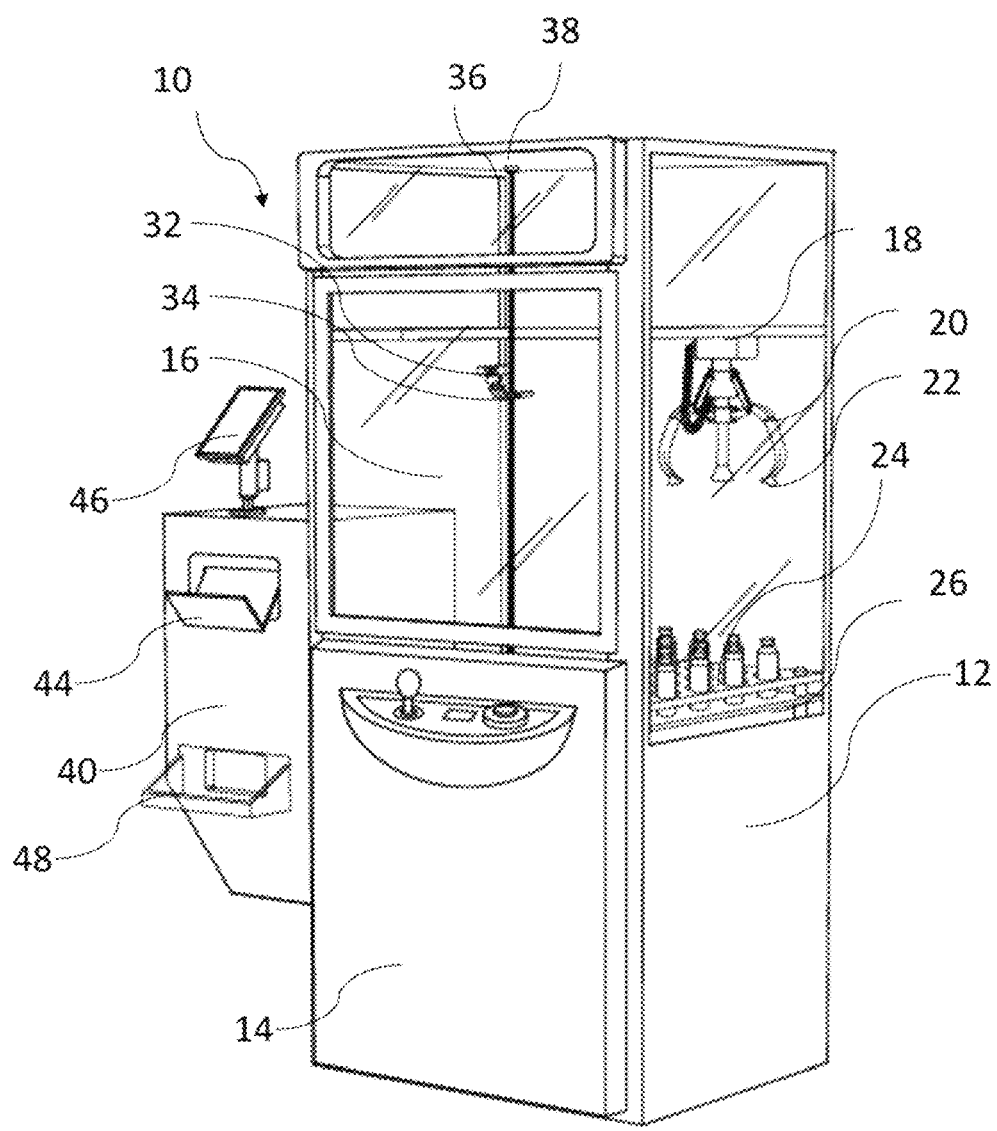
FIG. 1 is a perspective view of one embodiment of a claw arcade game with a photo booth feature.
Figure 2:
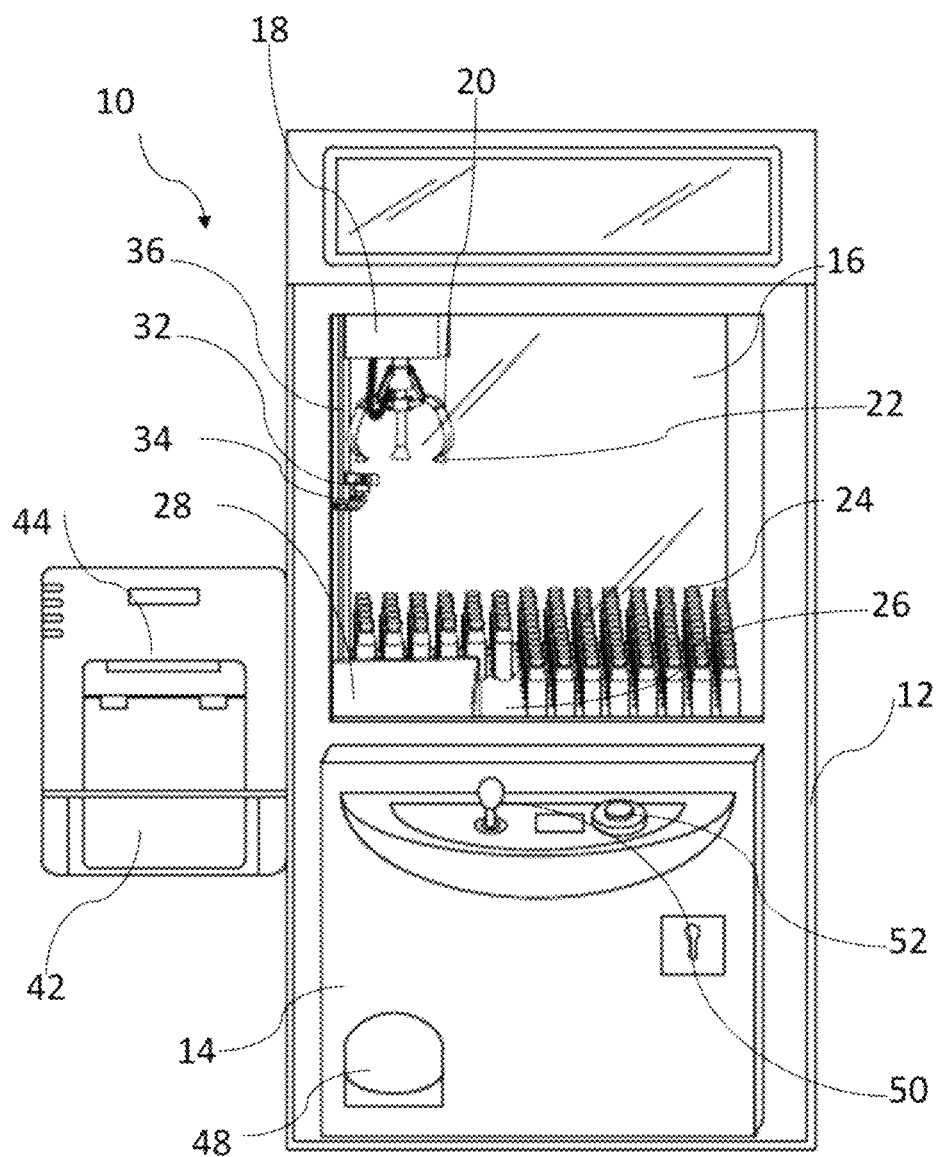
FIG. 2 is a front view of another embodiment of a claw arcade game with a photo booth feature.
Figure 10:
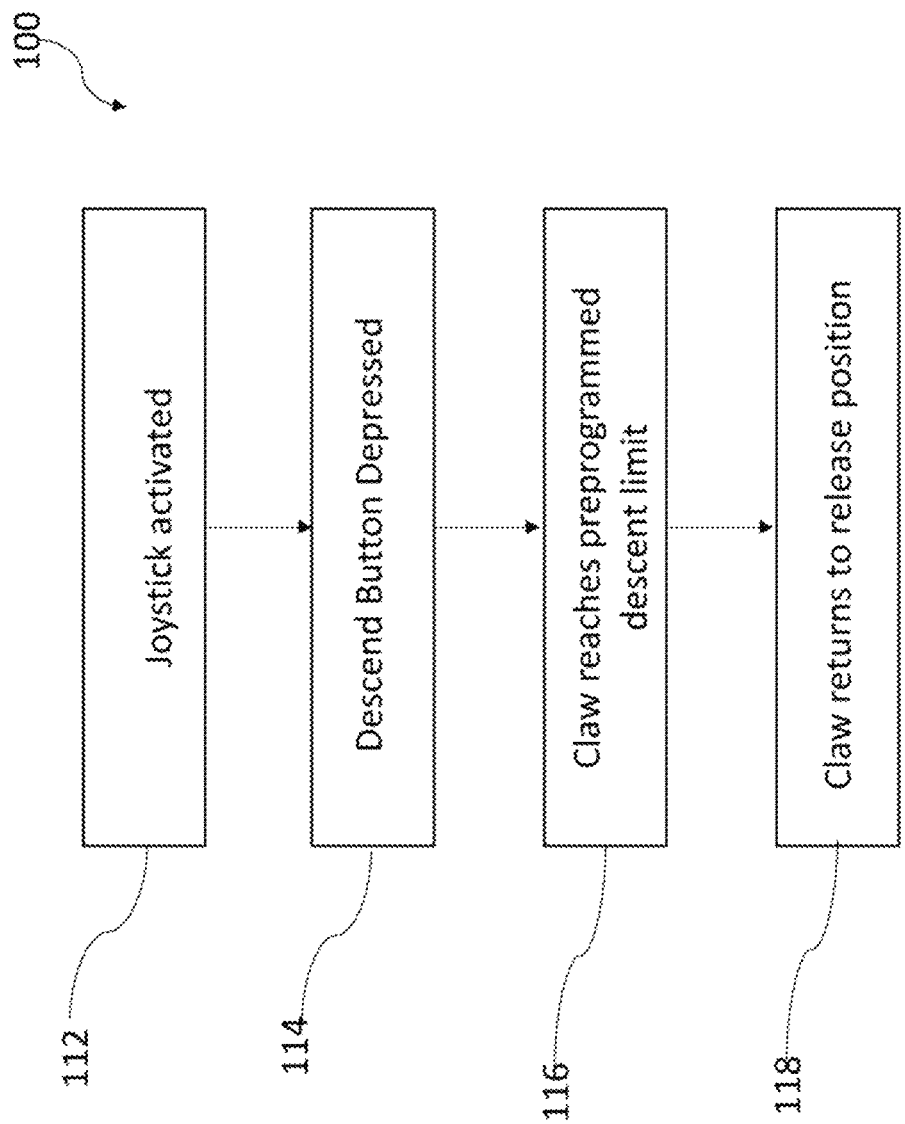
FIG. 10 is a flow chart illustrating the four relevant phases of a claw-style arcade game.

Referring now to FIGS. 1, 2, and 10, an enhanced claw-type arcade game 10 includes a unique photo booth feature. The claw-type arcade game may include a game housing 12, a claw assembly 18, a claw control unit 110, a camera assembly 30, a printer 42, and a photo booth control unit 120 configured to be interfaced with the claw control unit 110 to produce real-time photographs of users as they play the game.

In one embodiment, the claw-type arcade game may include an enclosed housing or cabinet 12 with transparent windows disposed around at least the top half of the housing 12 and cabinet walls, including a user facing door 14, disposed around the bottom half of the housing 12. Typically, both the user facing viewing window 16 and door 14 are configured to be opened and closed for maintenance and restocking of the game 10. The housing 12 may further include a shelf (not shown), upon which a plurality of prizes 24 may be disposed. The shelf may generally separate the transparent top half of the housing 12 from the opaque bottom half of the housing 12. In this embodiment, the prizes 24 are miniature bottles of liquid, such as 50 ml bottles of alcoholic beverages. However, it should be understood that the prizes may be any item that is of interest to the users and is capable of being grasped by the flanges 20 of the claw assembly 18. Other such items may include, but are not limited to plush toys, packaged toys, packaged mobile phone accessories, beauty accessories, candy, etc.

In one embodiment, the claw game 10 is configured, using the claw control unit 110 (FIG. 9), to carry out at least four distinct phases (FIG. 10) of a single game sequence. In this embodiment, the claw game 10 is configured to first allow a user to begin a first phase of the game by controlling a retractable claw assembly 18 with a joystick, push button, touch pad, or other suitable user interface(s). Using a joystick 50, the claw assembly 18 is movable about a horizontal plane disposed toward the top portion of the housing 12 using known methods, machinery, and components. The claw assembly 18 may include a plurality of flanges 20 with molded distal tips 22 that extend in a downward direction toward the prizes 24 located on the shelf below. In this embodiment, the plurality of flanges 20 remain in an open configuration. However, it should be understood that in various other embodiments the flanges 20 may begin the first phase of the game in a closed position and open as the claw assembly 18 descends, as described below.

During a second phase of the game, when the user has moved the claw assembly 18 to a desired location within the top portion of the housing 12, the user presses an activation or descend button 52, for example, and the flange 20 portion of the claw assembly 18 is configured to descend vertically toward the plurality of bottles 24 disposed on the shelf below.

The flanges 20 are then configured to move to a closed position at the bottom of a preprogramed descent distance, or a lower limit of the claw. Upon reaching the preprogrammed descent distance, the flanges 20 are configured to move to a closed position to complete the third phase of the game. If the user has positioned the flanges 20 correctly, the claw will close around one of the plurality of miniature bottles 24.

Once the flanges 20 have moved to a closed position, the claw assembly 18 is configured to move in an upward direction, lifting any bottle 24 the user has captured from the shelf and to a position above a prize chute 28 (as shown in FIG. 2) disposed within in the shelf. In this embodiment, the flanges 20 of the claw assembly 18 are configured to open over the prize chute 28 and return to a starting position in an open configuration, completing the fourth phase of the game. The bottle 24 then falls through the prize chute 28 to a prize delivery pad or basket 48 accessible by the user outside of the housing. It should be understood that the basic claw-type arcade game may be commercially available through various retailers or may be custom built using known methods, machinery, and components.

Referring now to FIGS. 3 and 4, the claw assembly 18 may generally include at least three flanges 20 configured to open and close around the individual prizes, such as the miniature bottles. As shown in FIG. 4, the flanges 20 may also include molded plastic or polymeric tips 22 that are configured to slip over the end portions of the flanges 20. The polymeric tips 22 are configured to enable the flanges 20 to better grasp the miniature bottles 24 when in a closed position. In one embodiment, the miniature bottles may also include a cap 25 that has been fitted with a magnetic film on its top portion. In this embodiment, the magnetic cap 25 would be attracted to a similarly magnetic film disposed at the convergence point 21 of the flanges.

It should be understood that the magnetic attraction between the cap 25 and the film disposed at the convergence point 21 should be strong enough to assist the user to grasp the bottle with the claw, but weak enough that once the claw is moved to an open position, the weight of the bottle is sufficient to release the cap from the claw. This feature facilitates prize recovery, leading to an enhanced user experience.

Figure 5:
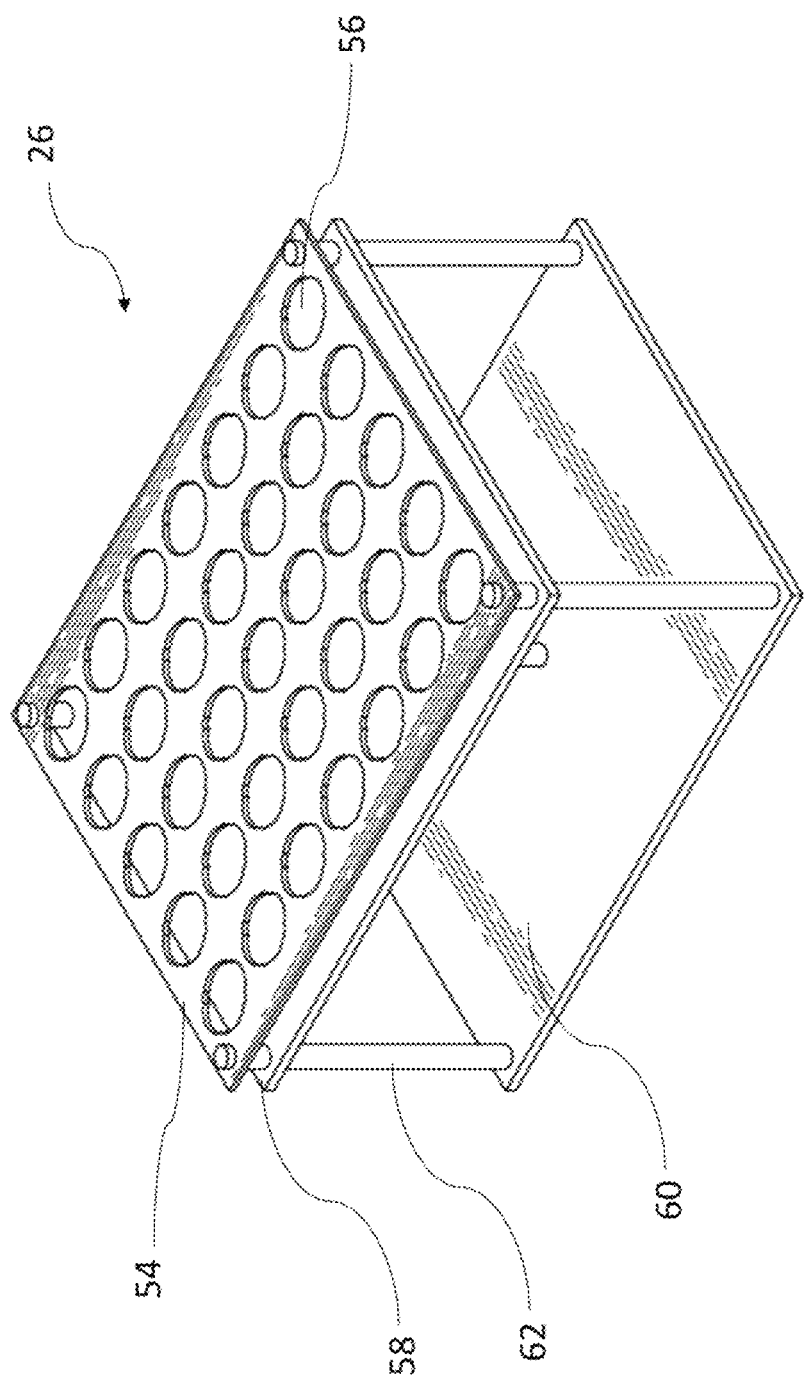
FIG. 5 is a perspective view of one embodiment of a miniature bottle tray for use with the claw arcade games of FIGS. 1 and 2.
Figure 6:
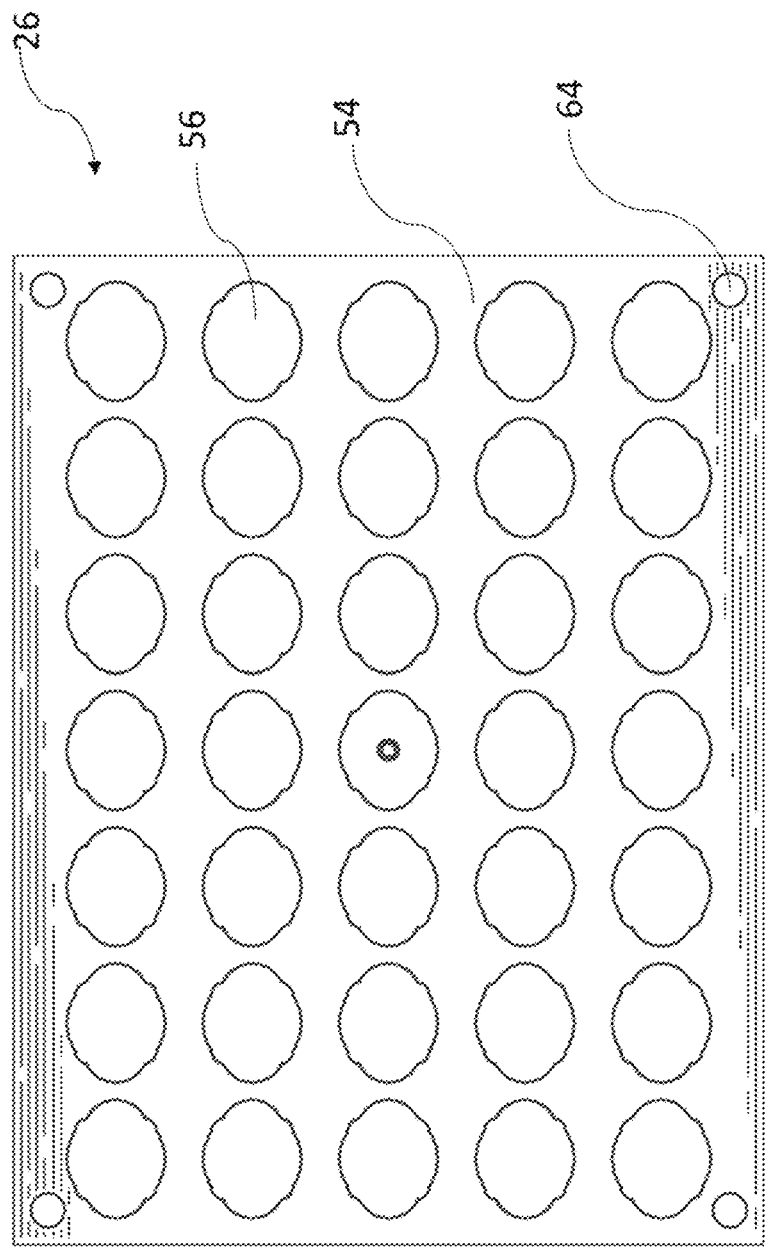
FIG. 6 is a top view of the miniature bottle tray of FIG. 5.
Figure 7:
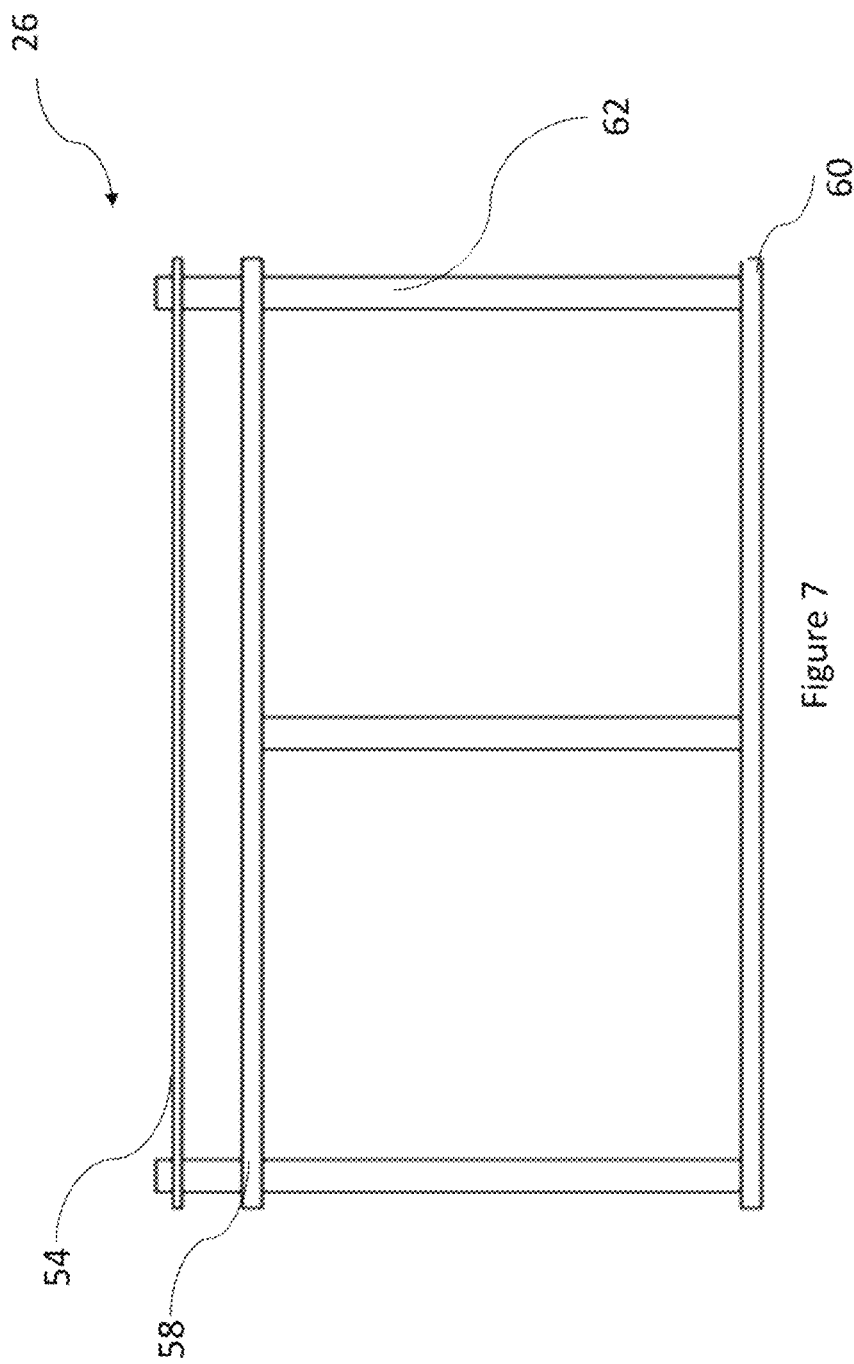
FIG. 7 is a side view of the miniature bottle tray of FIG. 5.

Referring again to FIG. 1, and to FIGS. 5, 6, and 7, in one embodiment, the prizes 24 are a plurality of miniature bottles of alcoholic beverages. In this embodiment, the bottles 24 are arranged on the shelf using a tray 26 (or trays) that is designed to be placed on top of the shelf and hold the bottles 24 in an upright and organized position. The tray further enables the bottles to be placed at a height sufficient for the bottles to be grasped by the flanges 20 of the claw assembly 18. The trays may be made of any suitable material, such as plastic, resin, steel, etc., and be made using known fabrication methods such as extrusion, 3D printing, and molding.

Referring now to FIGS. 5-7, the tray 26 may include a top portion 54 that includes a plurality of laser cut or 3D printed openings 56 that are designed to receive each individual bottle 24. The bottles 24 then rest on a middle portion 58 of the tray. The tray 26 may further include a bottom portion 60 that is designed to sit on the shelf inside of the top portion of the housing 12. The top 54, middle 58, and bottom portions 60 of the tray are separated by a plurality of legs 62 that separate and support the individual portions at desired heights. The legs 62 may be rods disposed at the outer corners of each portion and in the center of the tray 26.

As shown in FIGS. 6 and 7, the legs at the corners of the tray 26 may be made as single pieces. These outer legs may be affixed to the bottom portion 60 of the tray and extend through, and friction fit, to leg openings 64 in the corners of the middle portion 58 and top portion 54 of the tray 24. Alternatively, the outer legs may be separate pieces affixed to the top and bottom surfaces of each portion of the tray. Also as shown in FIG. 7, the tray 26 may optionally include a center leg 62 that extends from the upper surface of the bottom portion 60 to the lower surface of the middle portion 58, which supports the weight of the bottles 24 and prevents the middle portion 58 of the tray 26 from bowing or breaking. The tray 26 may be designed to cover the entire shelf of the housing. In another embodiment, the tray 26 may cover only a portion of the shelf. And in another embodiment, more than one tray may be used in combination to cover all or a portion of the shelf upper surface.

Figure 8:
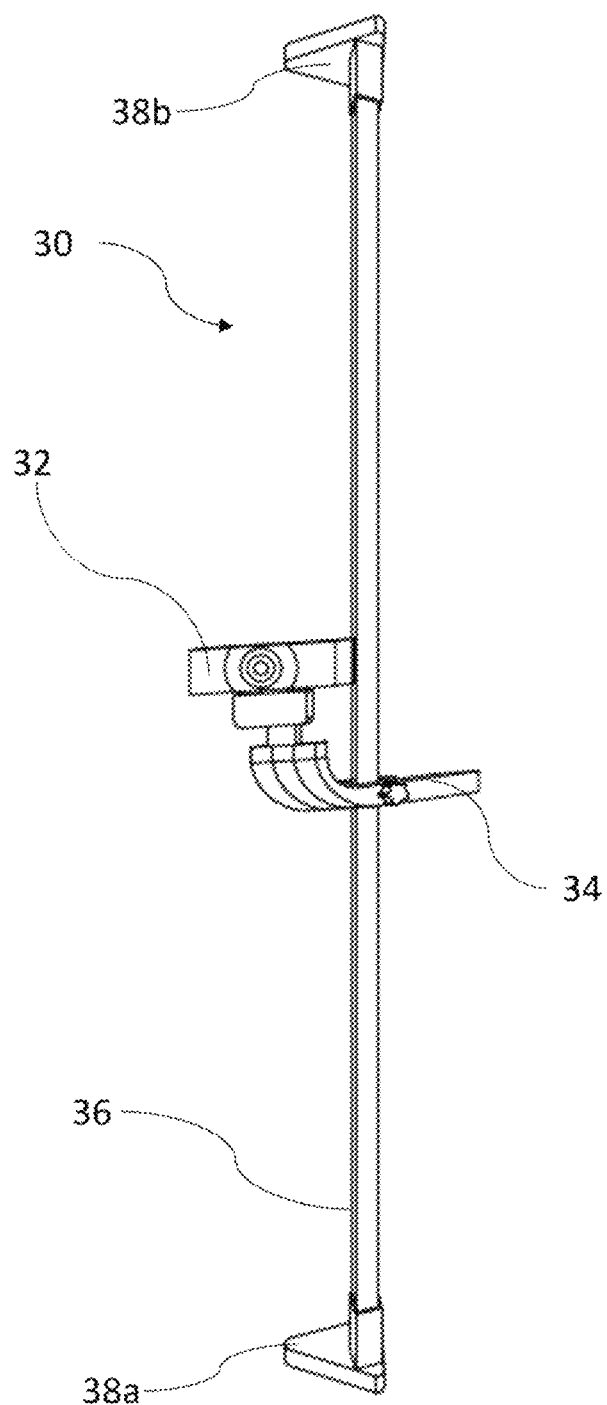
FIG. 8 is a detailed perspective view of a camera assembly for use with the claw arcade game of FIGS. 1 and 2.
Figure 12:
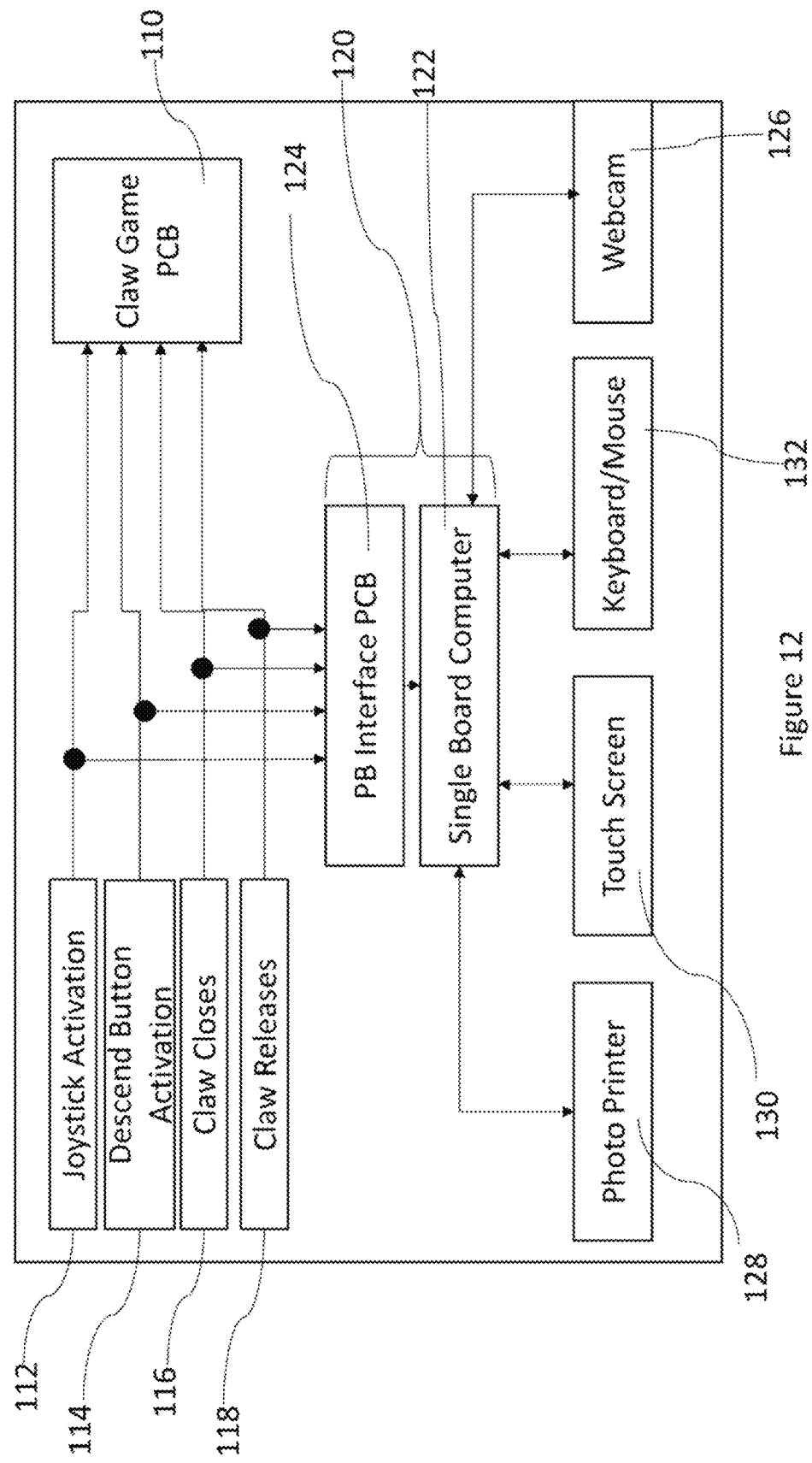
FIG. 12 is a flow chart depicting the system architecture for one embodiment of a claw arcade game with photo booth feature.

Referring again to FIGS. 1 and 2, and now to FIGS. 8 and 12, the claw arcade game may further include a camera assembly 30 and photo booth control unit 120 that is disposed inside of the game housing 12 and is integrated with the operation of the claw game 10 and the claw control unit 110. Specifically, the camera assembly 30 and photo booth control unit 120 include hardware and software that are configured to be interfaced directly with the claw control unit 110 of the claw arcade game that interacts with the joystick 50, descend button 52, and claw assembly 18.

In one embodiment, the camera assembly 30 includes a camera 32, a mounting bracket 34, mounting support 36, and feet 38a and b. As shown in FIGS. 1 and 2, the camera assembly 30 may be disposed inside the housing 12 at either back corner, with the camera 32 pointed toward the user at the controls. In one embodiment, the camera 32 is attached to the mounting support 36 with a mounting bracket 34. The mounting support 36 generally extends between the ceiling of the housing 12 and the shelf and is affixed to both using the mounting feet 38a and b, disposed at either end. While the mounting bracket 34 may be adjustable in the vertical direction along the mounting support 36 and a 360° axis around the support, the mounting bracket 34 and the camera 32 will generally be positioned along the mounting support 36 at a point that enables the camera to capture the entire viewing window 16, and therefore any user or users positioned in front of the window.

Figure 9:
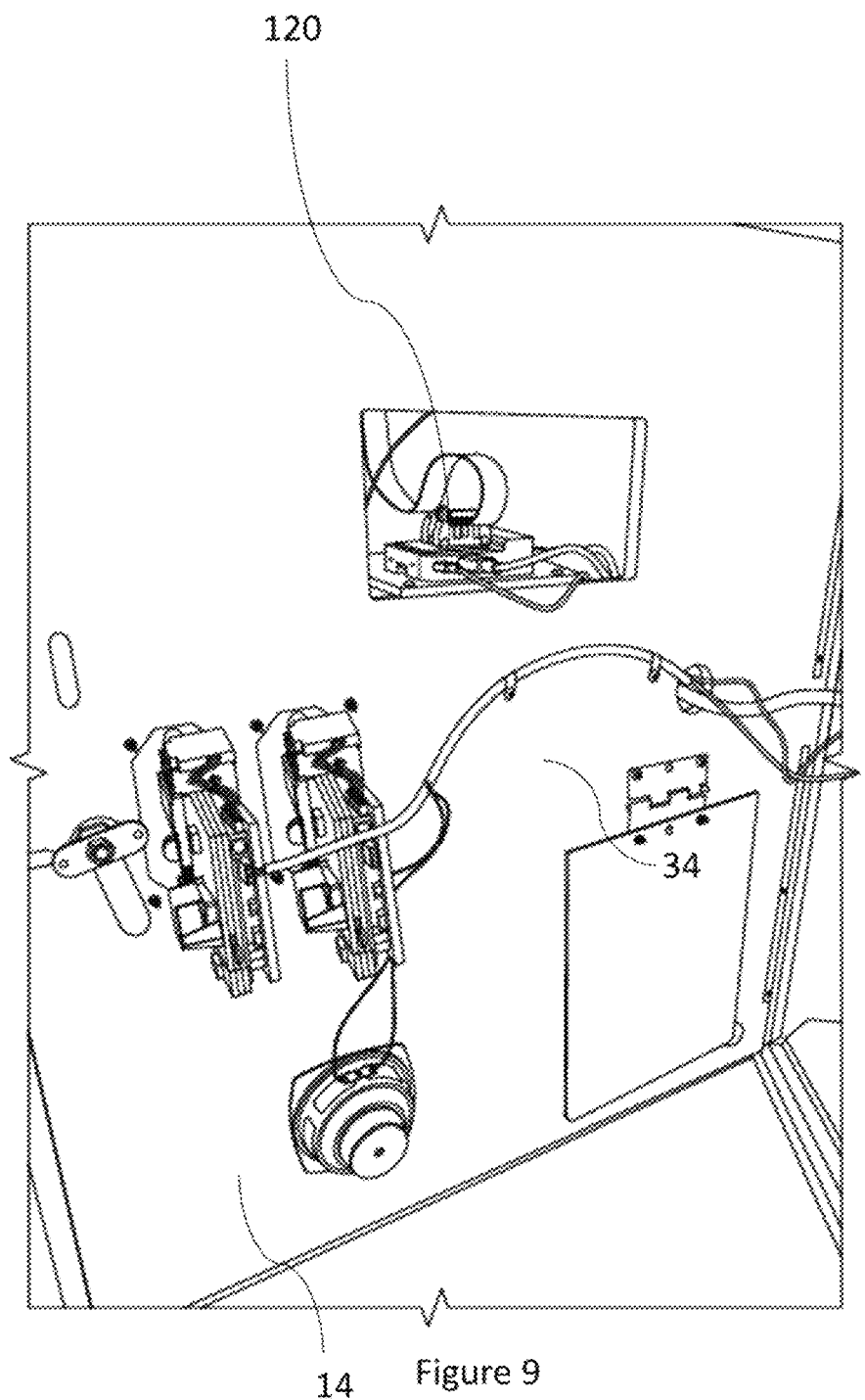
FIG. 9 is a detailed perspective view of the inside of a door of one embodiment of the claw arcade game.
Figure 11:
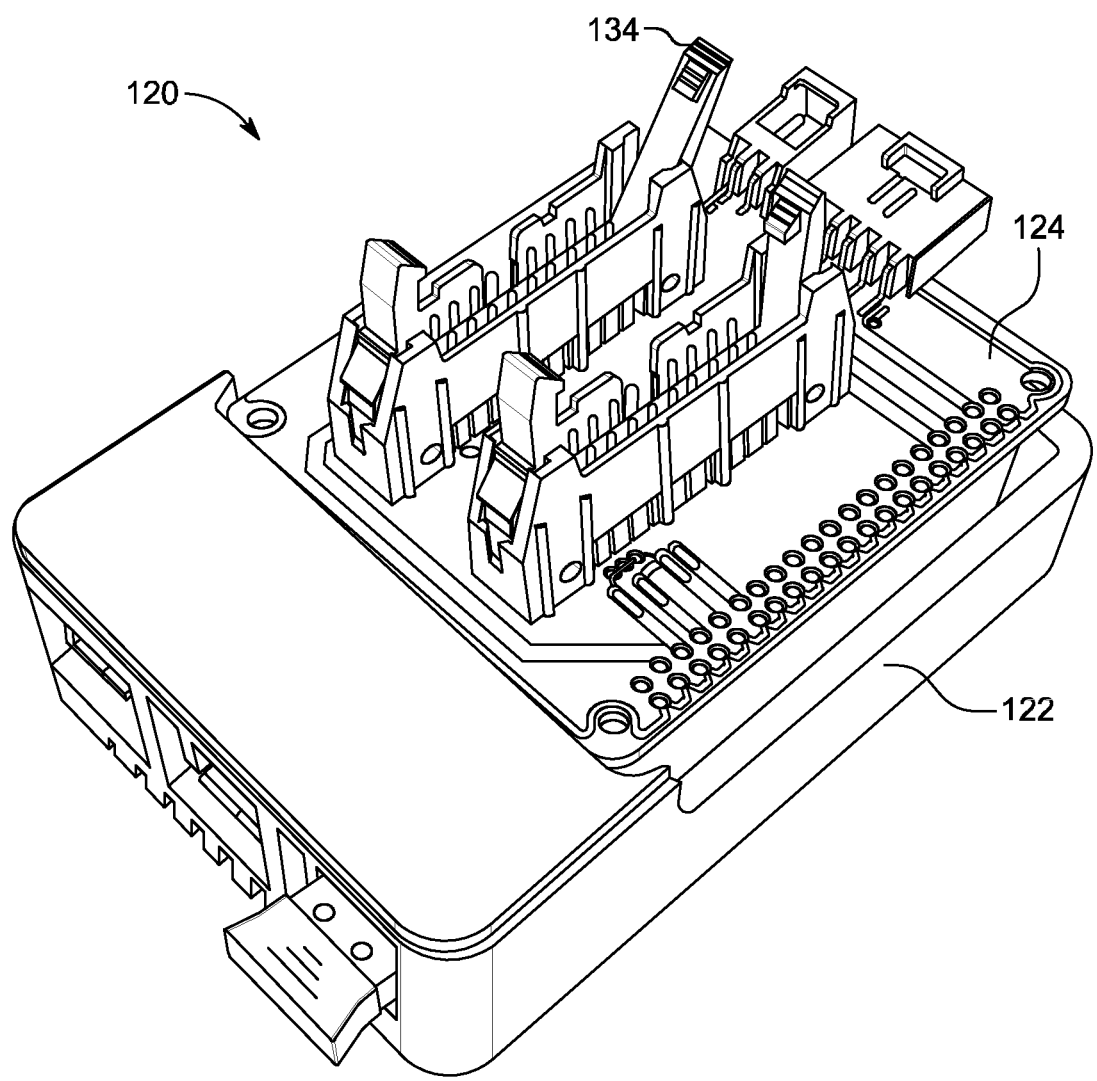
FIG. 11 is a photograph of an exemplary photo booth control unit.

In one embodiment, the camera is a Logitech C920HD USB powered webcam, commercially available from Logitech, however it should be understood that any suitable camera or video camera may be used. The mounting bracket 34 is similarly commercially available and configured to connect the bottom of the camera 32 to the mounting support 36 using an adjustable screw, or other suitable connections. And the mounting support 36 may be a modular low-profile mount bar that is configured to fit within the 3D printed feet 38 at either end. The feet 38 may be affixed to the ceiling and shelf using wood screws, adhesive, etc. Once mounted, the camera assembly 30 may be connected to the photobooth control unit 120 (FIGS. 9, 11, and 12) using a USB cable (not shown) that is routed down the back of the mounting support 26 and through a small hole in the shelf of the housing 12. The USB cable may then be connected to the USB hub of the photo booth control unit 120 that is disposed within the bottom half of the housing. As shown in FIG. 9, in one embodiment, the photobooth control unit 120 may sit within a cavity on the inside of the housing door 14.

Referring now to FIG. 10, it should be understood that various commercially available claw-style arcade games may be modified to create the claw game disclosed herein. Generally, claw-style arcade games will include at least one control unit, generally found on a printed circuit board within the machine, that is configured to control the game, as described above. It should also be understood that the claw-style game may be custom manufactured. It has been determined, however, that in order to provide the disclosed claw game with unique photo booth feature, it is necessary to interface the control unit that interacts with the joystick, descend button, and claw assembly (the claw control unit 110) with custom hardware and software configured to power and control a photo booth feature (a photo booth control unit 120).

In order to interface a unique photo booth control unit 120 with an existing claw control unit 110, it is necessary to isolate and identify the relevant electrical connections and signals within the claw control unit 110 that control and correlate to the four relevant phases of the game (See FIG. 10). For the purpose of this disclosure, the four relevant phases (or points) within the game sequence 100 correlate the points at which the camera will be programmed to take a picture.

The first phase, or point, begins when the joystick is activated by the user 112. The second phase begins when a user depresses the descend button 114, causing the claw assembly to descend toward the prizes below. The third phase begins as the claw assembly reaches a preprogrammed descent limit and the flanges of the claw assembly move to a closed position 116. The fourth phase ends when the assembly is disposed above the prize chute and the flanges move to an open position once again 118. Each of these points within the game sequence represents a point at which the camera is programmed to take a picture.

As discussed above, the claw arcade game with photo booth feature includes at least two separate control units. However, it should be understood that a single custom-built integrated control unit may replace both units. In one embodiment, the first control unit may be a printed circuit board (PCB) configured to control the claw functions, i.e. the claw control unit 110. The claw control unit 110 may be commercially available or may be uniquely designed for the individual machine. The key claw functions that are controlled or interfaced by the claw control unit 110 may include the activation of the joystick 112, lowering the claw when the descend button is depressed 114, closing the claw at the bottom of the claw descent 116, and releasing the claw over the prize chute 118.

In one example, in order to determine which electrical connections, switches, and signals from the claw control unit 110 should be interfaced with the photo booth control unit 120, the claw control unit 110 was monitored using a multimeter/voltmeter/continuity meter, or a combination thereof, as the game was repeatedly engaged to determine where and when the appropriate signals of interest manifest in order to permit electrical connection and interface to the SBC within the PB control unit 120. Based on the readings from the multimeter, the relevant connections at the pin-level of the claw control unit 110 were identified and correlated to the desired photo points.

In another example, rather than configuring the photo booth control unit 120 to interface with the claw control unit 110 at the PCB for each relevant point, the joystick and descend buttons may be interfaced directly to the photo booth control unit 120.

Once the relevant connections from the claw control unit 110 were identified, the photo booth (herein after "PB") control unit 120 is provided to interface with the existing architecture of the claw arcade game. In one embodiment, the PB control unit 120 may include a single board computer (SBC) 122 coupled to a PB interface PCB 124. For the purposes of this disclosure a single board computer is a complete computer built on a single circuit board, with microprocessors, memory, input/output and other required features. The SBC may be a Raspberry Pi 3 B+ SBC, commercially available from Raspberry Pi. The Raspberry Pi 3 B+ is a SBC with 1 GB RAM, 1.4 GHz, 64 bit quad-core CPU. The PB control unit 120 may further include connector pair 134, such as the Amphenol 18 pin IDC, capable of connecting the PB control unit 120 to the main claw control unit 110. An exemplary PB control unit 120 may be seen in FIG. 11.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

In one embodiment, the PB control unit 120 is configured to monitor the status of, and sense, the claw control unit 110 phases/signals/switches/buttons that have been previously identified as relevant to the photo booth feature. Referring now to FIG. 12, in one embodiment, the relevant signals from the claw control unit 110 (or points during the game sequence) include the signals, switches, and limits generated by A) the activation of the joystick 112, B) depression of the descend button 114, C) closure of the claw flanges 116, and D) the release of the claw flanges over the prize chute 118.

Upon sensing each signal, phase, or limit, the PB control unit 120 is further configured to execute a program stored in its memory and instruct the camera 126 to take a picture of the user during at least one of the four specific points (112, 114, 116, and 118) during the game sequence, and desirably at all four of the points. In another embodiment, the PB control unit 120 may be configured to instruct the camera to take photographs at three specified points during the game, in another embodiment, the SBC 122 is configured to instruct the camera to take photographs at two specified points during the game, and in yet another embodiment, the SBC 122 is configured to instruct the camera to take photographs at random points throughout the game. The PB control unit may also be configured to interface with a touch screen 130, keyboard and mouse 132, and a photo printer 128. The touch screen, keyboard, and mouse may also be operated using the SBC software so that an operator may, among other functions, run routine maintenance, reset the camera, or reprint necessary images.

Figure 13:
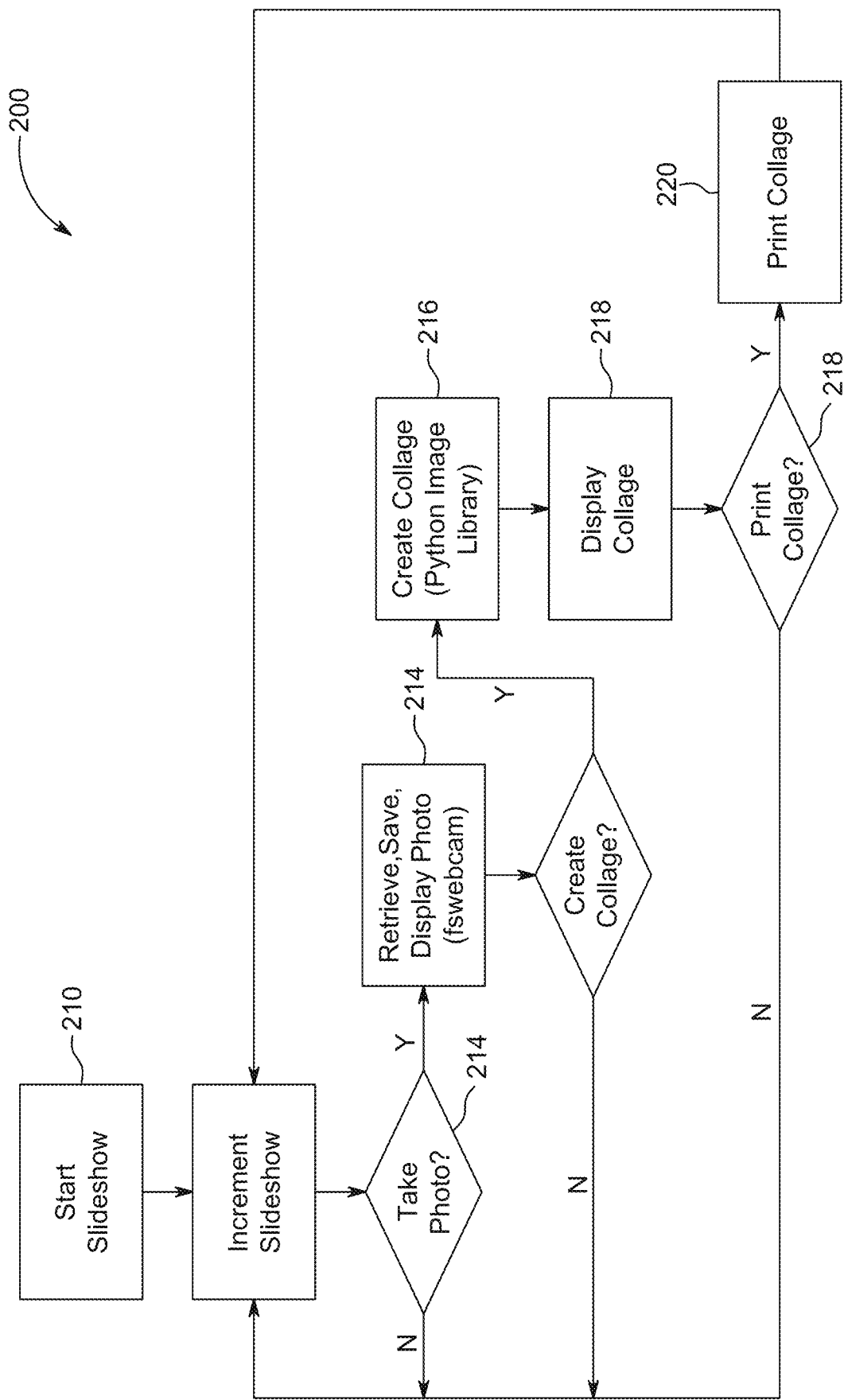
FIG. 13 is a flow chart depicting one embodiment of the computer programming and software useful for configuring the photo booth control unit to take photographs and produce a photo collage.

Referring now to FIG. 13, using a Python-based computer program 200, for example, the SBC 122 is configured to run an attached touchscreen device, or other suitable monitor, and to present to the user a slide show 210 of sample photographs while the claw arcade game is played, instruct the camera to take pictures 214, store, retrieve, and display the pictures from the camera 214 using a program such as fswebcam, create a collage of the photos 216 using, for example the Python Image Library to manipulate and edit the photos, display the collage 218, and print the collage at the attached printer 220.

Figure 14:
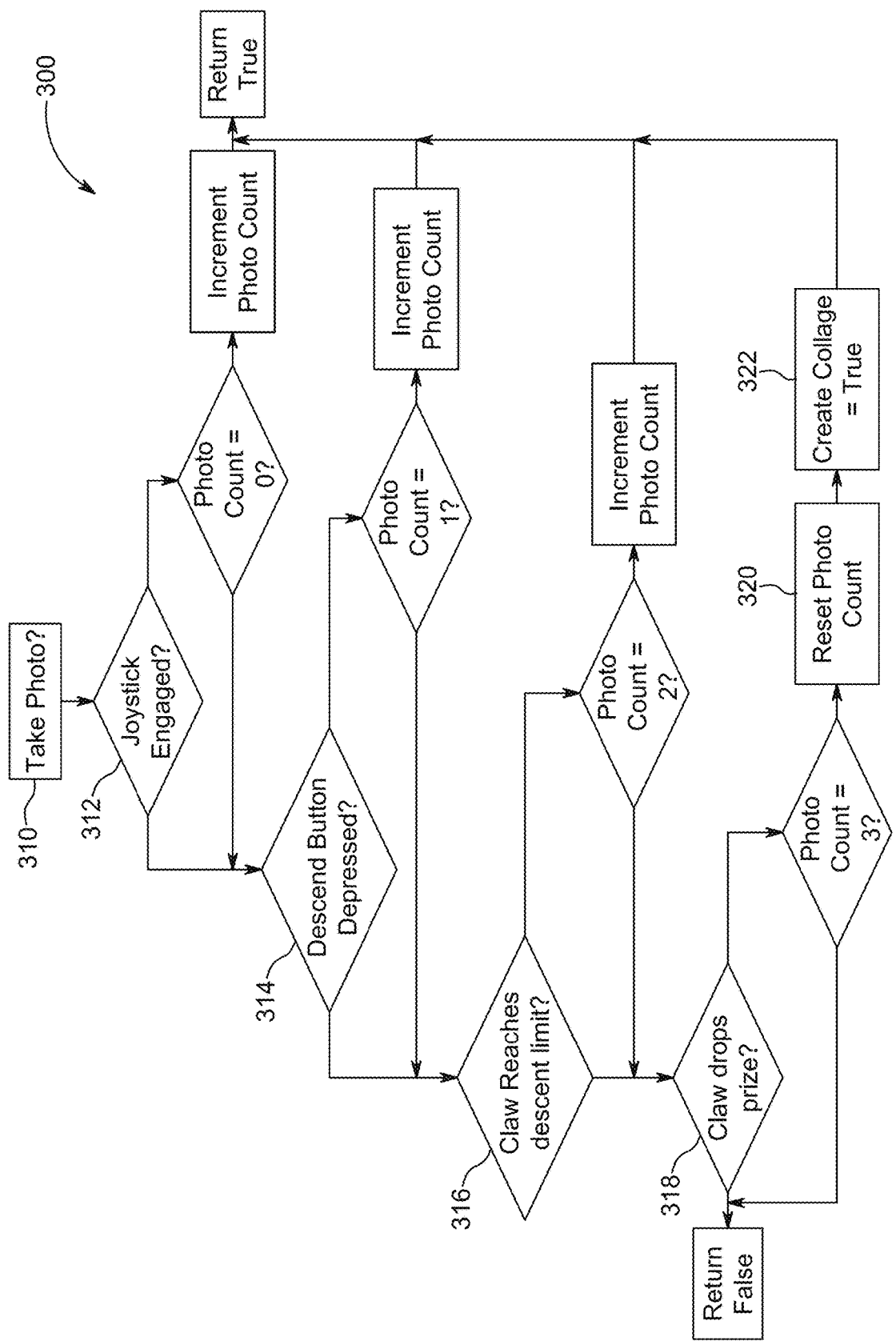
FIG. 14 is a flow chart depicting one embodiment of further computer programming useful for configuring the photo booth control unit.

As shown in FIG. 14, a computer program 300 stored on the photo booth control unit 120 is configured to instruct the camera to take a series of photographs 310 if the PB control unit senses that the joystick is engaged 312, the descend button is pressed 314, the claw reaches is descent limit 316, the claw drops its prize 318. Once the claw drops its prize 318 (or opens an empty claw), the photo count is reset 320 and a photo collage is created 322 by the SBC and sent to the printer.

The photographs may then be stored on the SBC 122 and directly retrieved from the SBC using a flash drive (not shown), for example, or sent to the photo printer. A suitable photo printer is the DNP DS-RX1 HS dye sublimation style photo printer. However, other suitable printers may be used. Using the photo printer, a photo booth collage strip-style picture may be produced by adjusting the settings within the CUPS printer configuration dialog. In one embodiment, the collage is created as a set of two 2×6 inch strips, each including four photos.

Figure 15:
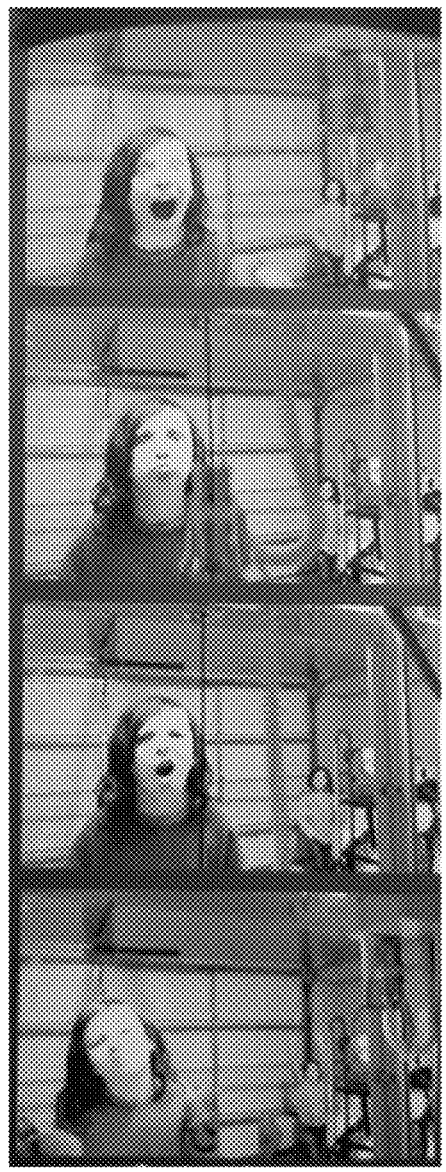
FIG. 15 is one embodiment of a photo collage taken with a camera assembly during use of the claw arcade games of FIGS. 1 and 2.

Referring again to FIG. 1, the photo printer may be housed inside a printer housing 40 that is attached to the side of the claw game 10. In this embodiment, once the game is complete and the claw assembly 18 has returned to its starting position, a photograph collage is produced and presented, along with any prize that the user won, to the user at the photo chute 44 and the prize delivery basket 48, respectively. In another embodiment, as shown in FIG. 2, the printer 42 may be separate from the claw game 10 housing 12. In this embodiment, the photo collage is produced at the printer 42 itself, while the prize 24, if won, is produced at the prize delivery basked 48 disposed in the door 14 of the housing 12 (FIG. 15).

Figure 16:
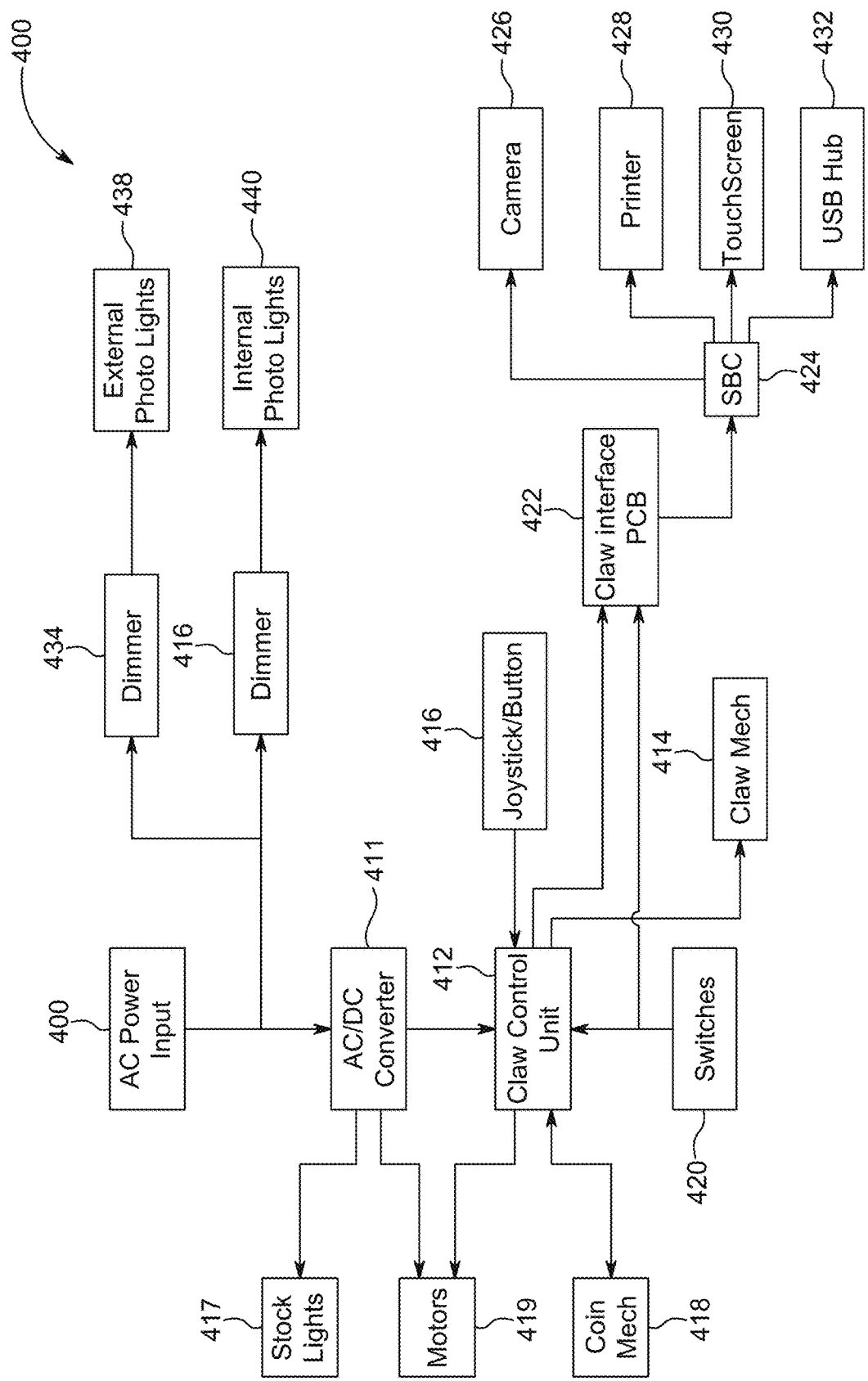
FIG. 16 is a flow chart depicting the integration of the electrical connections within one embodiment of the claw arcade game with photo booth feature.

Referring now to FIG. 16, the electrical connections 400 of the claw arcade game may be integrated into a single AC Power input 410 that powers, via an AC/DC converter 411, the claw control unit 412, including the claw 414, joystick and descend button 416, manufacturer-provided lights, motors, coin operation mechanisms 418, and switches 420. The PB control unit (interface PBC 422 and SBC 424), along with its associated features, including the camera 426, printer 428, touch screen 430, and USB Hub, may also be wired to receive power via the same AC Power input 410.

In addition to integrating the claw machine controls with the photo booth features, the claw arcade game may also include customized lighting to optimize the photographs taken by the camera from inside the game. In one embodiment, the lighting may include dimmable LED lights on the inside sides, ceiling, etc., of the game housing, as well as lights positioned on the outside of the game housing. The lighting features, including at least two dimmer lights 432 and 434, external photo lights 436, and internal photo lights 438, may also be connected to a power source through a single AC Power Input, as shown in FIG. 16.

The terminology used herein is for the purpose of describing particular embodiments only and is not intended to be limiting of the embodiments of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "comprised of" or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept. Having described the invention in detail and by reference to the various embodiments, it should be understood that modifications and variations thereof are possible without departing from the scope of the claims of the present application.

What is claimed is:

1. A claw arcade game comprises:
    a housing;
    a claw assembly that is movable along a horizontal and a vertical plane within the housing and wherein the claw assembly comprises a plurality of flanges capable of being moved from an open position to a closed position;
    a claw control unit configured to control the movement of the claw assembly within the housing, wherein the claw control unit generates at least one unique signal that correlates to an event related to the movement of the claw assembly during a single game sequence;
    a camera assembly comprising a camera mounted within an upper portion of the housing; and
    a photo booth control unit configured to monitor at least a portion of the unique signals generated by the claw control unit, to sense the at least one unique signal that correlates to the event related to the movement of the claw assembly, and to instruct the camera to take a photo in response to the sensing of the at least one unique signal.

2. The claw arcade game of claim 1, wherein the claw control unit is configured to produce a plurality of unique signals that each correlate to a unique event related to the movement of the claw assembly.

3. The claw arcade game of claim 2, wherein each of the plurality of unique signals are configured to correlate to an initial activation of a joystick, a depression of a descend button, movement of the plurality of flanges from the open position to the closed position, movement of the plurality of flanges from the closed position to the open position, or a combination thereof.

4. The claw arcade game of claim 3, wherein the photo booth control unit is also configured to monitor and sense signals received directly from a joystick, descent button, or other input device.

5. The claw arcade game of claim 4, wherein the photo booth control unit is configured to instruct the camera to take a photograph upon sensing a signal from the claw control unit or the input device, retrieve the photographs from the camera, and store the photographs in memory disposed within the photo booth control unit.

6. The claw arcade game of claim 5, wherein the photo booth control unit is configured to format the stored photographs and send the formatted photographs to a printer.

7. The claw arcade game of claim 1, wherein distal ends of the plurality of flanges are each covered with a polymeric tip.

8. The claw arcade game of claim 1, wherein the housing comprises an upper portion and a lower portion which are separated by a shelf; and wherein the housing further comprises a tray configured to support a plurality of miniature bottles.

9. The claw arcade game of claim 8, wherein the tray comprises a upper portion, a middle portion, and a lower portion, and wherein the upper portion comprises a plurality of similarly sized opening.

10. A method of interfacing a photo booth feature with a claw arcade game, the method comprising the steps of:
providing a claw arcade game comprising a housing, a claw assembly that is movable along a horizontal and a vertical plane within the housing and wherein the claw assembly comprises a plurality of flanges capable of being moved from an open position to a closed position, and a claw control unit configured to control the movement of the claw assembly within the housing, wherein the claw control unit generates a plurality of unique signals that each correlate to a movement of the claw assembly during a single game sequence;
identifying a set of desired points during the single game sequence at which a photograph should be taken;
identifying a single signal from the plurality of unique signals that correlates to at least one of the desired points; and
configuring a photo booth control unit to sense the single signal, and in response to sensing of the single signal, to instruct a camera to take a photograph.

11. The method of claim 10, wherein the set of desired points during the single game sequence include an initial activation of a joystick, a depression of a descend button, movement of the plurality of flanges from the open position to the closed position, movement of the plurality of flanges from the closed position to the open position, or a combination thereof.

12. The method of claim 11, wherein the method further comprises the step of providing adjustable lighting components on the inside of the housing.

13. The method of claim 11, wherein the method further includes the step of configuring the photo booth control unit sense unique signals directly from an input device.

14. The method of claim 13, wherein the input device is selected from a joystick, a descend button, or a combination thereof.

15. The method of claim 14, wherein the method further includes the step of retrieving the photographs from the camera, storing the photographs in digital memory within the photo booth control unit, and formatting the photographs into a single collage.

16. The method of claim 15, wherein the method further comprises sending the collage to an attached printer.

* * * * *